United States Patent
Schweid et al.

(10) Patent No.: US 10,846,575 B1
(45) Date of Patent: Nov. 24, 2020

(54) PROBABILISTIC PIXEL BIASING IN LOW AREA COVERAGE

(71) Applicant: Xerox Corporation, Norwalk, CT (US)

(72) Inventors: Stuart Schweid, Pittsford, NY (US); Roger L. Triplett, Penfield, NY (US); John Newell, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/164,992

(22) Filed: Oct. 19, 2018

(51) Int. Cl.
| | |
|---|---|
| *G06K 15/02* | (2006.01) |
| *G06K 15/10* | (2006.01) |
| *B41J 2/045* | (2006.01) |
| *B41J 2/21* | (2006.01) |

(52) U.S. Cl.
CPC ........ *G06K 15/1843* (2013.01); *B41J 2/0456* (2013.01); *B41J 2/04586* (2013.01); *B41J 2/2121* (2013.01); *G06K 15/102* (2013.01)

(58) Field of Classification Search
CPC ........... G06K 15/1843; G06K 15/1873; G06K 15/1876; G06K 15/102; G06K 15/1223; B41J 2/0456; B41J 2/04586; B41J 2/04593; B41J 2/04595; B41J 2/2121; B41J 2/2125

See application file for complete search history.

(56) References Cited

U.S. PATENT DOCUMENTS

| | | | |
|---|---|---|---|
| 5,696,845 A | 12/1997 | Loce et al. | |
| 6,771,392 B1 | 8/2004 | Ebner | |
| 7,440,139 B2 | 10/2008 | Loce et al. | |
| 2007/0291065 A1* | 12/2007 | Shibata | B41J 2/2056 347/15 |

* cited by examiner

*Primary Examiner* — Moustapha Diaby
(74) *Attorney, Agent, or Firm* — Fay Sharpe LLP

(57) ABSTRACT

Methods, apparatuses, devices, and systems are disclosed herein for upscaling an input image to a higher resolution while simultaneously converting the image data from a multi-drop state to a binary state. These systems and methods use a probabilistic combination of randomized and biased positioning of inkjet firings in order to yield perceptibly lower graininess in low-coverage areas of output prints without introducing new artefacts.

16 Claims, 7 Drawing Sheets

US 10,846,575 B1

PROBABILISTIC PIXEL BIASING IN LOW AREA COVERAGE

BACKGROUND

Systems and methods herein generally relate to printing devices, and more particularly to upscaling an image associated with a multi-state printhead(s) to an image associated with a single-state printhead(s).

Ink-jet printers fire drops of ink from one or more printheads onto a print medium or image-receiving surface. Recently, multi-state ink-jet printers have been developed with inkjets that can eject drops of ink with different sizes (i.e. volumes of ink), thereby improving image quality. There exists methods and techniques for rendering continuous tone images to be encoded and printed on a multi-state ink-jet printer that using a variable ink droplet size. However, in order to achieve complete device-independence, efficient methods of accurately altering image resolution and enhancement are required to take advantage of the technology. Hence, it is desirable to develop systems and methods for upscaling continuous tone images rendered to be printed using a multi-state ink-jet printer into images able to be printed at a higher resolution and using a single-state ink-jet printer.

Furthermore, conventional upscaling techniques can create certain undesirable artefacts and graininess in the upscaled output image. For example, particular upscaling methods and devices generate a graininess in low-coverage areas of an image, but not in areas of more coverage. Thus, it is also desirable to have systems and methods that can accurately upscale multi-state image data to binary image data, without creating a graininess in low-coverage areas or creating additional artefacts when transitioning from low-coverage areas to higher-coverage areas.

INCORPORATION BY REFERENCE

U.S. Pat. No. 9,654,667 B1, by Mantell, issued May 16, 2017 and entitled "SYSTEM AND METHOD FOR STOCHASTIC VECTOR HALFTONING OF CONTONE DATA IN A PRINTER HAVING VARIABLE PRINTING PARAMETERS" is incorporated herein by reference in its entirety.

BRIEF DESCRIPTION

In accordance with one embodiment of this disclosure, described is a method of upscaling an input image from a lower resolution to a higher resolution comprising: receiving a multi-state contone image data associated with the input image having a first resolution, wherein the multi-state contone image data includes a plurality of pixel values and an associated ink droplet size selected from two or more possible ink droplet sizes for each pixel of the multi-state contone image data; converting each pixel of the multi-state contone image data into a pattern of single-state inkjets activated in a plurality of N-by-M blocks of a binary output image data, wherein the single-state print jets are configured to eject ink droplets of a single size; and outputting the binary output image data having a second resolution, wherein the binary output image data. In particular embodiments, N and M are integers greater than or equal to 1, and the second resolution is greater than the first resolution. In some embodiments, the pattern of single-state inkjets activated within one or more of the N-by-M blocks is randomized. In further embodiments, the method also includes operating at least one single-state inkjet in a single-state printhead with reference to the binary output image data to form an output image on a print medium or image-receiving surface that corresponds to the binary output image data.

In accordance with another embodiment of this disclosure, described is a method of upscaling an input image from a lower resolution to a higher resolution comprising: receiving a multi-state contone image data associated with the input image having a first resolution, wherein the multi-state contone image data includes a plurality of pixel values and an associated ink droplet size selected from two or more possible ink droplet sizes for each pixel of the multi-state contone image; determining a degree of isolation for each of the pixels of the multi-state contone image data; assigning a bias probability value to each pixel of the multi-state contone image data based on the degree of isolation corresponding to each pixel; converting each pixel of the multi-state contone image data into a pattern of single-state inkjets activated in a plurality of N-by-M blocks of a binary output image data based on the bias probability value assigned to each pixel, wherein the single-state inkjets are configured to eject ink droplets of a single size; and outputting the binary output image data having a second resolution. N and M may be integers greater than or equal to 1, and the second resolution is greater than the first resolution.

In particular embodiments, the degree of isolation for a pixel of the multi-state contone image data is determined by: receiving pixel values for a plurality of pixels within P-by-Q block of the multi-state contone image data; and determining a number of zero-pairs associated with a first pixel of the plurality of pixels within the P-by-Q block; wherein P and Q can be integers greater than or equal to 2, and the degree of isolation of the first pixel corresponds to the number of zero-pairs associated with the first pixel.

In accordance with still another embodiment of this disclosure, described is a printing system that upscales an input image from a lower resolution to a higher resolution, the system comprising: a multi-state contone image data associated with the input image having a first resolution, wherein the multi-state contone image data includes a plurality of pixel values and an associated ink droplet size selected from two or more possible ink droplet sizes for each pixel of the multi-state contone image; one or more printheads configured to operate one or more single-state inkjets to eject ink droplets of only one size to form pixels in ink images on a print medium or image receiving surface; a processor operatively connected to the one or more printheads; and a memory connected to the processor and containing programming instructions that are configured to instruct the processor to (i) receive from an image source the multi-state contone image data, (ii) convert each pixel of the multi-state contone image data into a pattern of single-state inkjets activated in a plurality of N-by-M blocks of a binary output image data; and (iii) output the binary output image data having a second resolution. N and M can be integers greater than or equal to 1, and the second resolution is greater than the first resolution. In further embodiments, the memory of the printing system contains programming instructions configured to instruct the processor to operate at least one inkjet in the one or more printheads with reference to the binary output image data to form an output image on a print medium or image-receiving surface that corresponds to the binary output image data In some embodiments, one or more of the pixels of the multi-state contone image data are converted into a pattern of activated inkjets within the N-by-M blocks, wherein the pattern is a randomized pattern.

In still further embodiments, the memory of the printing system contains programming instructions configured to instruct the processor to: determine a number of zero-pairs associated with one or more pixels of the multi-state contone image data by analyzing a plurality of pixels surrounding the one or more pixels; assign a bias probability value to each of the one or more pixels based on the number of zero-pairs associated with each of the one or more pixels; determine whether to bias each of the one or more pixels based on the bias probability value assigned to each of the one or more pixels; and convert each of the one or more pixels of the multi-state contone image data into a pattern of activated inkjets in one or more N-by-M blocks of the binary output image data, wherein N and M are integers greater than or equal to 2, and wherein the pattern of activated inkjets corresponding to each of the one or more pixels is one of a biased pattern or a randomized pattern based on the determination of whether to bias each of the one or more pixels.

In some embodiments described herein, a pixel of the multi-state contone image data can have from between zero and four zero-pairs, including zero zero-pairs, one zero-pair, two zero-pairs, three zero-pairs, and four-zero pairs.

BRIEF DESCRIPTION OF THE DRAWINGS

The particular aspects and features discussed in the present disclosure can be varied and are referenced merely to illustrate one or more embodiments and are not intended to limit the scope thereof.

DETAILED DESCRIPTION

Various methods, apparatuses, devices, and systems are described herein which upscale an input image represented by a multi-state contone image data having a first, lower resolution into a binary, single-state output image data having a second, higher resolution. These methods, apparatuses, devices, and systems find particular application in the field of inkjet printers.

As used herein, the term "contone image data" refers to multi-bit digital data representing an image comprising continuous tone data values used to identify an intensity level for a primary color (e.g. cyan, magenta, yellow, and black) at each pixel of the image, which can be used in the ink of a printer to reproduce the image.

As used herein, the term "multi-state contone image data" refers to contone image data that includes a parameter corresponding to the size (i.e. volume) of the ink droplets to be ejected by a multi-state inkjet. A "multi-state inkjet" or a "multi-state printhead" similarly refer to an inkjet and a printhead configured to eject multiple ink droplet sizes, for example, based on a multi-state contone image data.

As used herein, the term "low-coverage area" refers to regions of an image wherein marked pixels are relatively isolated. That is, for example, when an image is formed, ink droplets are relatively spaced out (i.e. a minimal number of inkjets are operated and amount ink used within a certain region). These low-coverage areas may represent, for example, light or highlighted areas within an image. Conversely, the terms "mid-coverage areas" and "high-coverage areas" refer to regions wherein pixels are less isolated, more inkjets are operated, and/or more ink is used.

Figure 1:
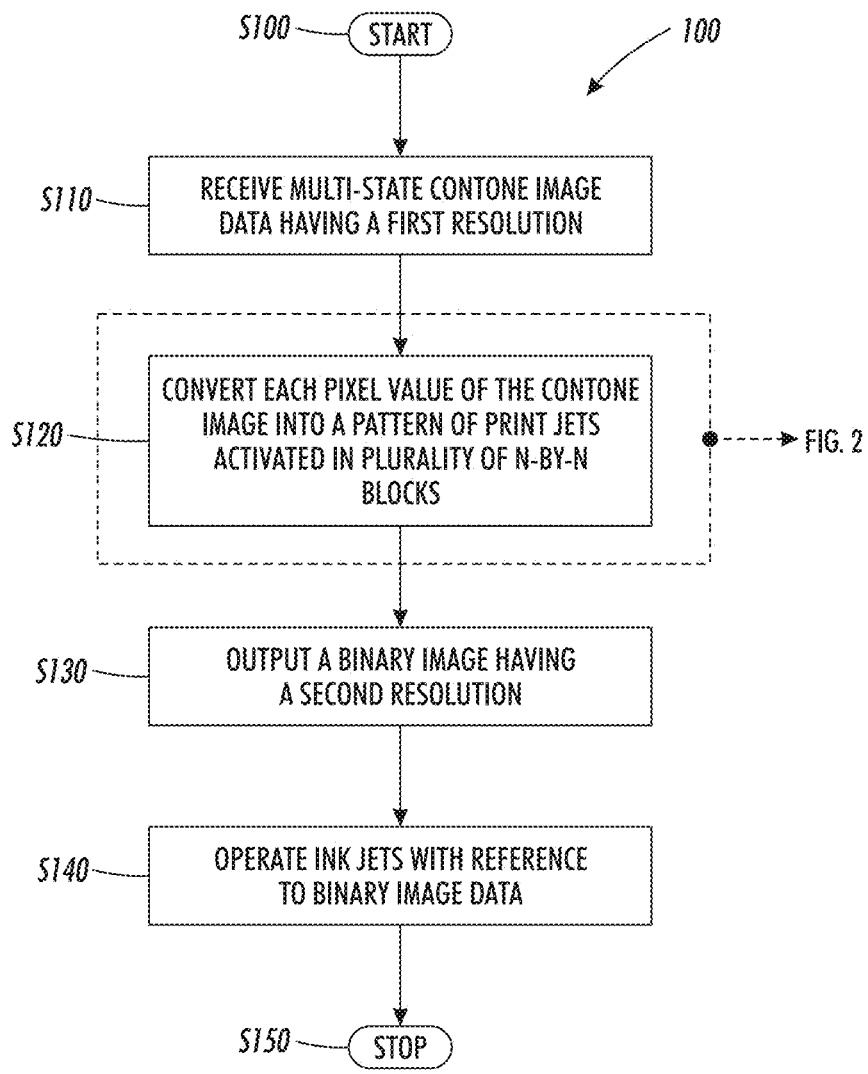
FIG. 1 is a flowchart of a method for upscaling an input image from a lower resolution to a higher resolution according to an exemplary embodiment of this disclosure.

Referring now to the drawings where the showings are for the purpose of describing one or more embodiments and not for limiting the same, a basic method 100 for upscaling an input image from a lower resolution to a higher resolution is depicted in FIG. 1. The method 100 begins at S100.

At step S110, a multi-state contone image data representing an input image is received. The multi-state contone image data includes a plurality of pixel values (i.e. continuous tone data values) for each pixel, as well as a parameter associating an ink droplet size to be used if printed using one or more multi-state inkjets. The associated ink droplet size can be selected from two or more possible ink droplet sizes, or from three or more possible ink droplet sizes. For example, the associated ink droplet size can be selected from a first volume, a second volume, and a third volume. In particular embodiments, the two or more different possible ink droplet sizes may range from about 3 to about 15 picoliters. For example, in some embodiments, the first volume may be 4 picoliters, the second volume may be 8 picoliters, and the third volume may be 12 picoliters.

At step S120, each pixel of the multi-state contone image data is converted (i.e. mapped) into a pattern of inkjets activated in a plurality of N-by-M blocks of a binary output image data. The variables "N" and "M" can be integers greater than or equal to 1, including greater than or equal to 2. In particular embodiments, each N-by-M block corresponds to the upscaled single pixel of the input image represented by the multi-state contone image data. That is, for example, an input image with a resolution of 600 dots per inch (dpi) may be upscaled to an output image with a resolution of 1200 dpi by mapping each pixel of the input image data to a plurality of 2-by-2 blocks of the output image. In such embodiments, the continuous tone values (i.e. pixel values) corresponding to each of the pixels of the multi-state contone image data are converted (i.e. mapped) to a pattern of inkjets activated in a plurality of 2-by-2 blocks of the output image data.

In particular embodiments, the output image data stores the patterns of activated inkjets for each of the N-by-M blocks of the output image as a binary output image data. In other words, for each of the pixels represented in the binary output image data, an associated "1" or "0" value is designated, based on the patterns of activated inkjets generated. In further embodiments, the patterns of activated inkjets forming the binary output image data also comprise an associated position parameter for each pixel of the output image (i.e. a parameter identifying where an ink drop should be placed in relation to each pixel). As discussed further with respect to FIG. 2, one or more ink droplets may be randomly placed, or may be biased in a particular direction (e.g. upper left, upper right, lower left, lower right, etc.) and by varying degrees.

At step S130, the binary output image data is output. For example, the binary output image data may be output to an inkjet printer to be printed on a print medium, or may be output to an electronic memory device.

In some embodiments, at a step S140, at least one inkjet may be operated with reference to the binary output image data to form an output image that corresponds to the binary output image data. In particular embodiments, the inkjets may be operated such that the output image is formed using ink droplets of only one size. In some embodiments, the inkjets are single-state inkjets (i.e. eject only one drop size in order to form an image on a print medium or image-receiving surface).

In particular embodiments, the multi-state contone image data corresponding to an input image may have a first resolution, and the output image data may have a second resolution, wherein the second resolution is greater than the first resolution. In some embodiments, the second resolution is at least twice the first resolution. For example, the first resolution may be from about 300 to about 600 spots per inch ("spi"), and the second resolution may be from about 600 to about 2400 spi. However, other resolutions are contemplated, including resolutions greater 2400 spi and resolutions less than 300 spi.

At step S150, the method ends.

Figure 2:
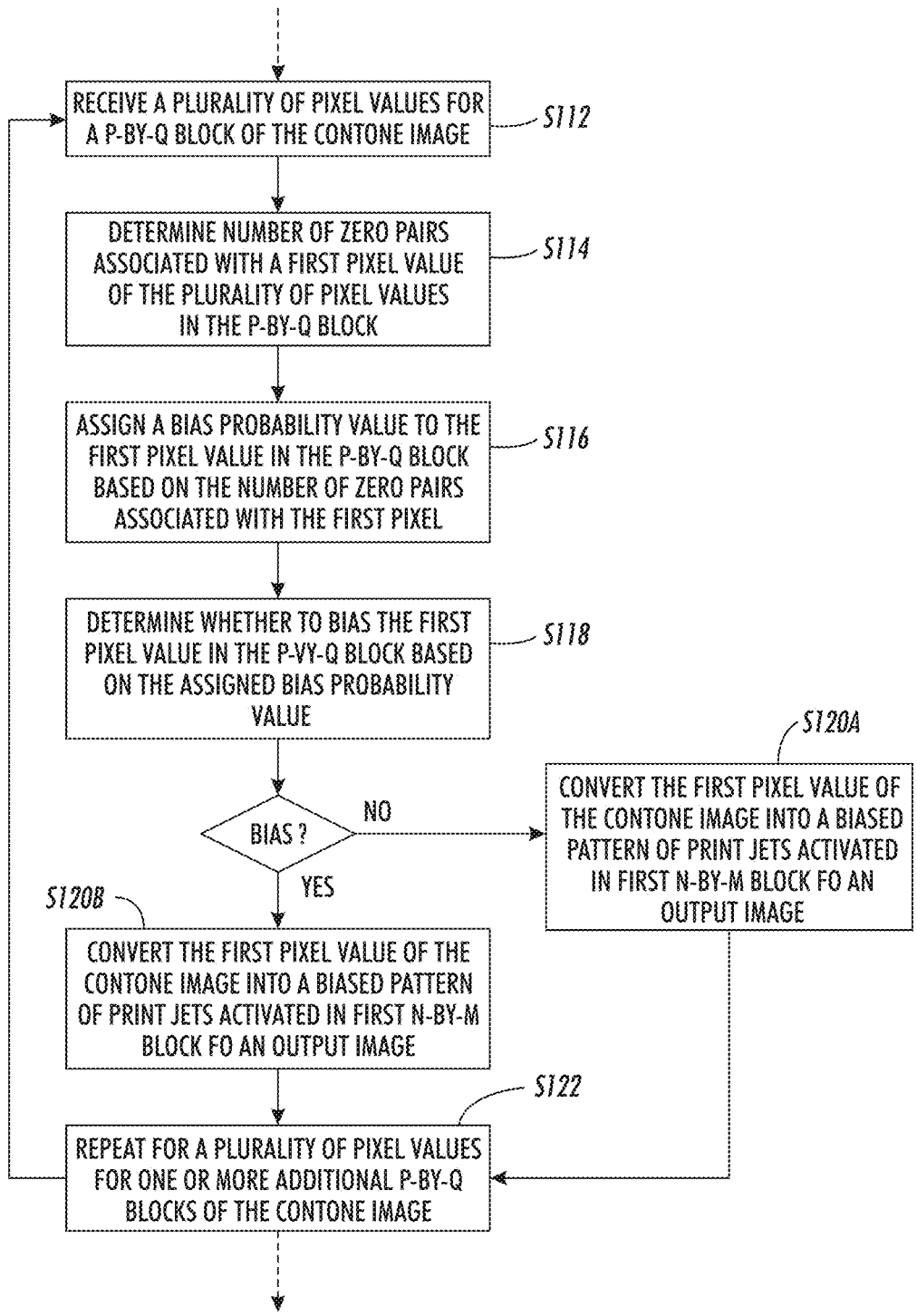
FIG. 2 is a second flowchart illustrating in further detail one aspect of the method of upscaling an input image according to an exemplary embodiment of this disclosure.

With reference to FIG. 2, the method 100 is described in further detail, After step S110 wherein the multi-state contone image data associated with an input image having a first resolution is received, a degree of isolation for each of the pixels of the multi-state contone image data is determined. In low-coverage areas, the degree of isolation of one or more pixels in a region will be higher.

In particular embodiments, the degree of isolation of a first pixel of the multi-state contone image may be determined by a first step S112, wherein pixel values for a plurality of pixels within a P-by-Q block of the multi-state contone image data is selected and received. The P-by-Q block may define a subset of pixels of the multi-state contone image, and includes the first pixel for which a degree of isolation is being determined. In particular embodiments, "P" and "Q" can be integers greater than or equal to 2. In further embodiments, "P" and "Q" may independently be 2 or 3.

Then, at a step S114, a number of zero-pairs for the first pixel is determined. As used herein, the term "zero-pairs" refers to the pairs of pixels on opposing sides of the first pixel, wherein both pixels in the pair of pixels have a pixel value of zero (i.e. is empty and an inkjet would not eject an ink droplet in that position).

In particular embodiments, a pixel may have 0, 1, 2, 3, or 4 zero-pairs. With reference to FIGS. 3A-3I, several P-by-Q blocks 301, 302, 303, 304, 305, 306, 307, 308, 309 of pixels are depicted to illustrate various combinations of zero-pairs wherein P and Q are both 3. For simplicity, each P-by-Q block 301, 302, 303, 304, 305, 306, 307, 308, 309 of pixels is illustrated on an X-Y coordinate system, with a first pixel 300A, 300B, 300C, 300D, 300E, 300F, 300G, 300H, 300I located at position (0,0). Also for simplicity, pixels having a non-zero value are depicted as shaded, whereas pixels having a zero value are not shaded. However, those of skill in the art will understand that a variety of pixel values may comprise a plurality of non-zero values.

Figure 3A:
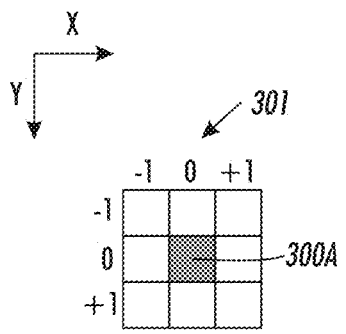
FIGS. 3A-3I are illustrations of various P-by-Q blocks of a multi-state contone image data with pixels having various degrees of isolation.

In FIG. 3A, first pixel 300A located at (0,0) within the P-by-Q block 301 has four zero-pairs: a first pair located at (−1,0) and (+1,0); a second pair located at (0,−1) and (0,+1); a third pair located at (−1,−1) and (+1,−1); and a fourth pair located at (−1,+1) and (+1,−1).

Figure 3B:
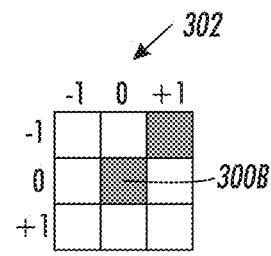
Figure 3C:
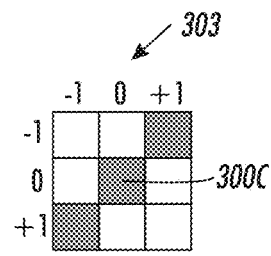

In FIG. 3B, first pixel 300B located at (0,0) within the P-by-Q block 302 has three zero-pairs: a first pair located at (−1,0) and (+1,0); a second pair located at (0,−1) and (0,+1); and a third pair located at (−1,−1) and (+1,+1). However, because the pixel located at (+1,−1) has a non-zero value, the pair including (+1,−1) and (−1,+1) is not a zero-pair. Similarly, in FIG. 3C, the pixel located at (−1,+1) also has a non-zero pair, thus the pair including (+1,−1) and (−1,+1) is not a zero-pair. In both P-by-Q blocks 302 and 303, the first pixels 300B and 300C have only three zero-pairs.

Figure 3D:
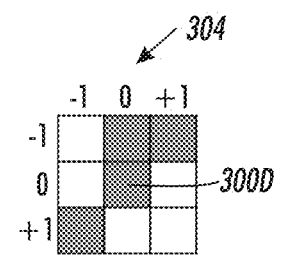
Figure 3E:
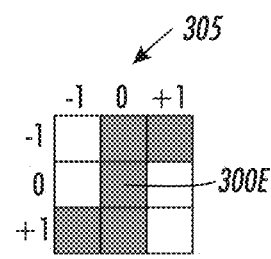

In FIGS. 3D and 3E, first pixels 300D, 300E located at (0,0) of P-by-Q blocks 304, 305 respectively, have two zero-pairs, including: a first pair located at (−1,−1) and (+1,+1); and a second pair located at (−1,0) and (+1,0).

Figure 3F:
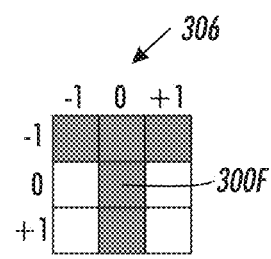
Figure 3G:
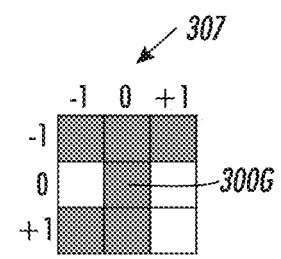

In FIGS. 3F and 3G, first pixels 300F, 300G located at (0,0) of P-by-Q blocks 306, 307 respectively, have only one zero pair located at (−1,0) and (+1,0).

Figure 3H:
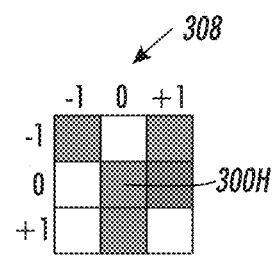
Figure 3I:
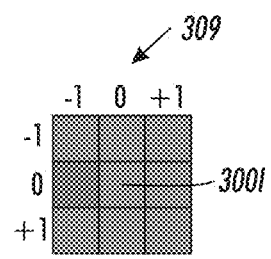

In FIGS. 3H and 3I, first pixels 300H, 300I located at (0,0) of P-by-Q blocks 308, 309 respectively, have no zero pairs.

Thus, as seen in FIGS. 3A-3I, up to four pairs of pixels adjacent to a first pixel 300A, 300B, 300C, 300D, 300E, 300F, 300G, 300H, 300I are identified with the P-by-Q blocks 301, 302, 303, 304, 305, 306, 307, 308, 309, the pixel values are identify and the number of non-zero pairs are counted. In particular embodiments, the degree of isolation associated with a pixel of the multi-state contone image is equal to the number of zero-pairs determined for that pixel. In such embodiments, a degree of isolation of zero for a pixel indicates that the pixel has zero zero-pairs and is not isolated. Similarly, a degree of isolation of four for a pixel indicates that the pixel has four zero-pairs is completely isolated.

Notably, although P-by-Q blocks 305, 306, and 308 each have four pixels with a pixel value of zero, the corresponding first pixels 300E, 300F, and 300H each have a different degree of isolation.

Figure 4A:
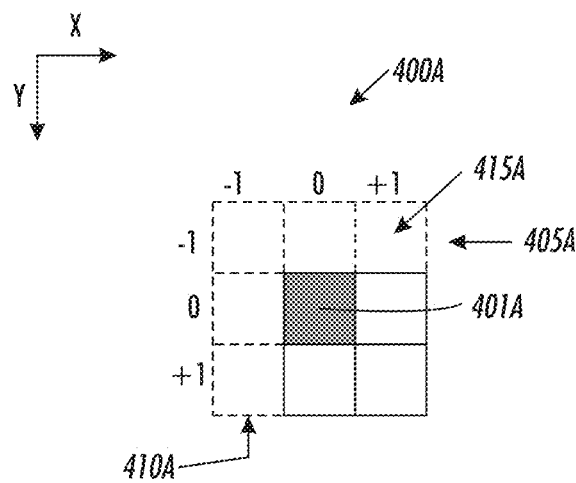
FIGS. 4A and 4B are illustrations of addition P-by-Q blocks of a multi-state contone image data with pixels selected along a corner (4A) and edge (4B) of an input image.
Figure 4B:
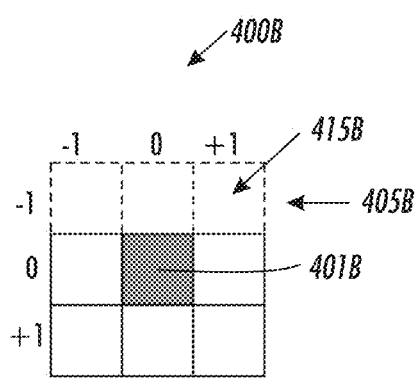

With reference to FIGS. 4A and 4B, the zero-pairs determination for a pixel on the border of the image is illustrated. In FIG. 4A, a pixel 401A occupying a corner of the image is selected within the P-by-Q block 400A, which is located at (0,0), is surrounded by pixels located (+1,0), (+1,+1), and (0,+1). Because the no pixels exist off-image, that is, along row 405A and column 410A, hypothetical pixels, such as pixel 415A located at (+1,−1), is defaulted to a value of zero. Similarly, in FIG. 4B, a pixel 401B occupies a position along the edge of an image, and no pixels exist off-image along row 405B. To determine the number of zero-pairs for such a pixel 401B, the hypothetical pixels 415B along row 405B are defaulted to a value of zero. For example, in FIGS. 4A and 4B, pixels 401A and 401B would have four zero-pairs each.

Turning back to FIG. 2, once a degree of isolation is determined for a pixel (e.g., by determining a number of zero-pairs for the pixel), a bias probability value is assigned to that pixel at a step S116. As used herein, the term "bias probability value" refers to a value representing the probability that the ink droplets within a pattern of inkjets generated are biased in a particular direction. Typically, the pattern of inkjets activated corresponding a pixel of a lower resolution image may be randomized when upscaling that pixel, however, this has been found to introduce a graininess in low-coverage areas (i.e. areas where there is a high concentration of isolated pixels). By biasing the inkjet patterns in these regions, the graininess may be reduced or eliminated. Further, by assigning a bias probability value based on the degree of isolation of a pixel (i.e. number of zero-pairs), a smooth transition from low-coverage areas to higher-coverage areas can be obtained. In particular embodiments, the bias probability value associated with a pixel may be between 0 and 1. In certain embodiments, the bias probability value may be 0, 0.25, 0.5, 0.75, or 1.

In most embodiments, a pixel of the multi-state contone image having a high degree of isolation will have a high bias probability value, while a pixel having a low degree of isolation will have a low bias probability value. In specific embodiments, a pixel having four zero-pairs has a bias probability value of 1, a pixel having three zero-pairs has a bias probability value of 0.75, a pixel having two zero-pairs has a bias probability value of 0.5, a pixel having one zero-pair has a bias probability value of 0.25, and a pixel having no zero-pairs has a bias probability value of 0. However, other probability values are contemplated.

At a step S118, the bias probability value is used in determining whether to bias the pixel of the multi-state contone image data when converting the pixel into a pattern of inkjets to be activated in the higher resolution binary image data. In particular embodiments, the particular pattern of inkjets that will be used is determined or configured prior to printing. For example, if a pixel has a bias probability of 0.25, then there is a 25% chance that the pixel will be rendered using the particular pre-determined pattern of inkjets, and a 75% chance that the pixel will be rendered using a randomized or other standard rendering technique. In particular embodiments, a random number generator may be used to determine whether to bias the pixel based on the bias probability value associated with that pixel.

If the pixel is determined to not be biased, the pixel is converted into a randomized pattern of activated inkjets in a N-by-M block of the output image data at a step S120A. In other words, the position of the ink droplets to be ejected from the inkjets within a N-by-M block corresponding to the pixel and forming a portion of the upscaled output image may be randomly placed within that N-by-M block. However, if the pixel is determined to be biased, the pixel is converted into a particular pattern of activated inkjets, determined a-priori, within a N-by-M block of the output image data at a step S120B. In other words, position of the ink droplets to be ejected from the inkjets within a N-by-M block corresponding to the pixel and forming a portion of the upscaled output image may be selectively placed within that N-by-M block to be biased in a particular direction.

Next, at a step S122, steps S112 through S120A/S120B are repeated for one or more pixels of the multi-state contone image. In particular embodiments, steps S112 through S120A/120B are repeated for a plurality of pixels, including for each pixel of the multi-state contone image. In other embodiments, the steps S112 through 120A/120B may be repeated only for each pixel having a non-zero value.

Figure 5:
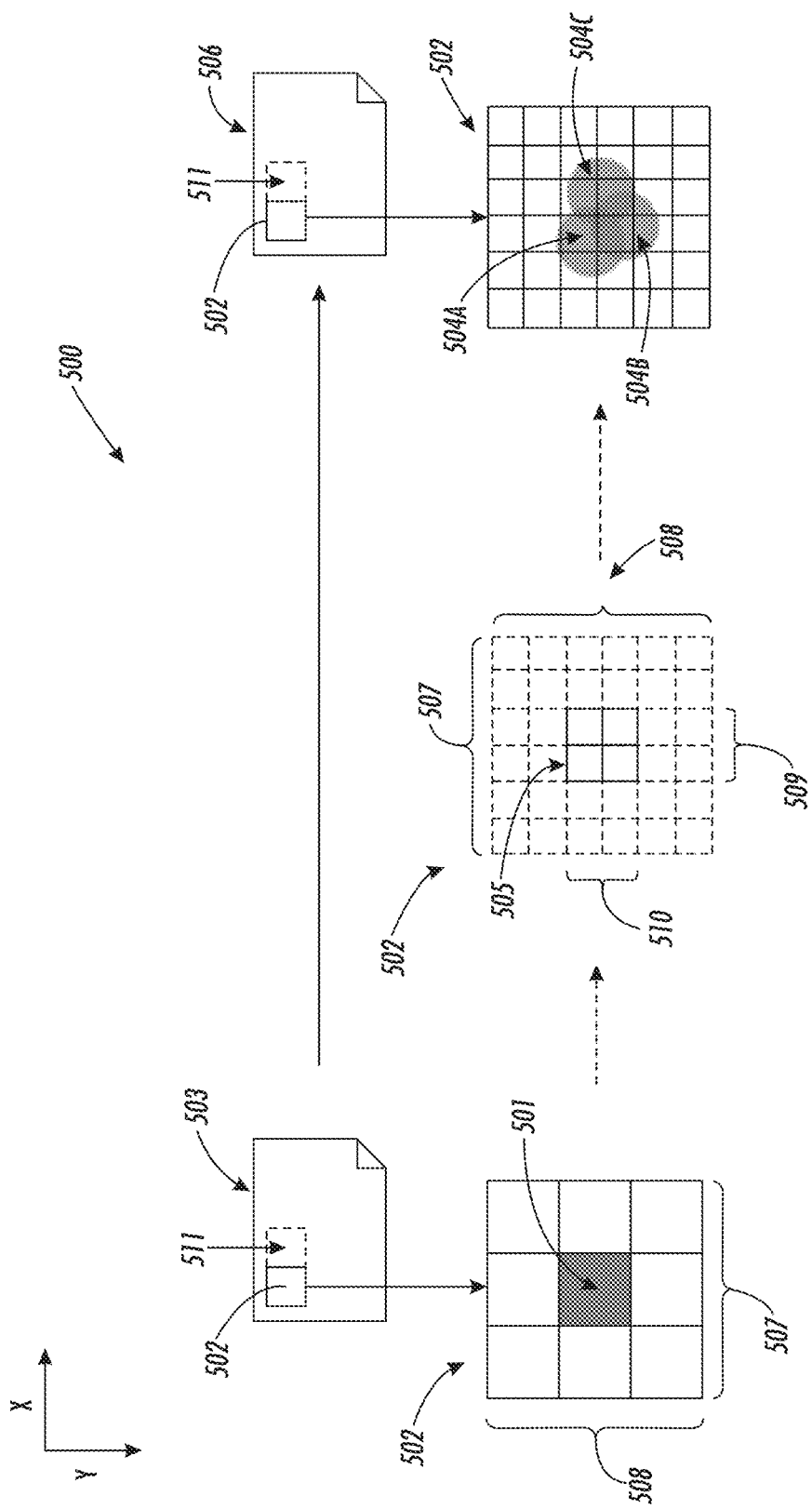
FIG. 5 is a schematic illustrating an upscaling method according to an exemplary embodiment of this disclosure.

The methods disclosed herein are further described within reference to FIG. 5, which depicts the conversion 500 of a pixel 501 within a P-by-Q block 502 of a multi-state contone image data representing a low resolution input image 503 into a pattern of inkjets to be activated to eject ink droplets 504A, 504B, 504C of a consistent volume within a N-by-M block 505 of an upscaled output image 506 generated by operating at least one inkjet with reference to the binary output image data. In the example shown, "P" 507 and "Q" 508 are both three, and "N" 509 and "M" 510 are both two. As discussed above, depending on the degree of isolation of the pixel 501, the pattern of inkjets activated within the N-by-M block 505 may be a randomized pattern of ink droplets 504A, 504B, 504C, or may be a biased pattern of ink 504A, 504B, 504C. This process may then be repeated for additional P-by-Q blocks 511 of the multi-state contone image data, including a plurality of P-by-Q blocks.

Furthermore, in particular embodiments, the pattern of activated inkjets includes the number of droplets 504A, 504B, 504C ejected. For example, in some embodiments, no ink droplets may be fired within the N-by-M block 505, or only one ink droplet may be fired, or two ink droplets may be fired, or three ink droplets may be fired. In particular embodiments, the pattern of inkjets activated within at least one N-by-M block 505 of the binary output image data includes ejecting at least one ink droplet. In other embodiments, the pattern includes ejecting at least two ink droplets, and in still other embodiments, the pattern includes ejecting at least three ink droplets.

Also disclosed herein are printing systems, apparatuses, and devices used for upscaling an input image from a lower resolution to a higher resolution, wherein the input image is represented by a multi-state contone image data, while simultaneously converting the multi-state input image into a binary output image.

Figure 6:
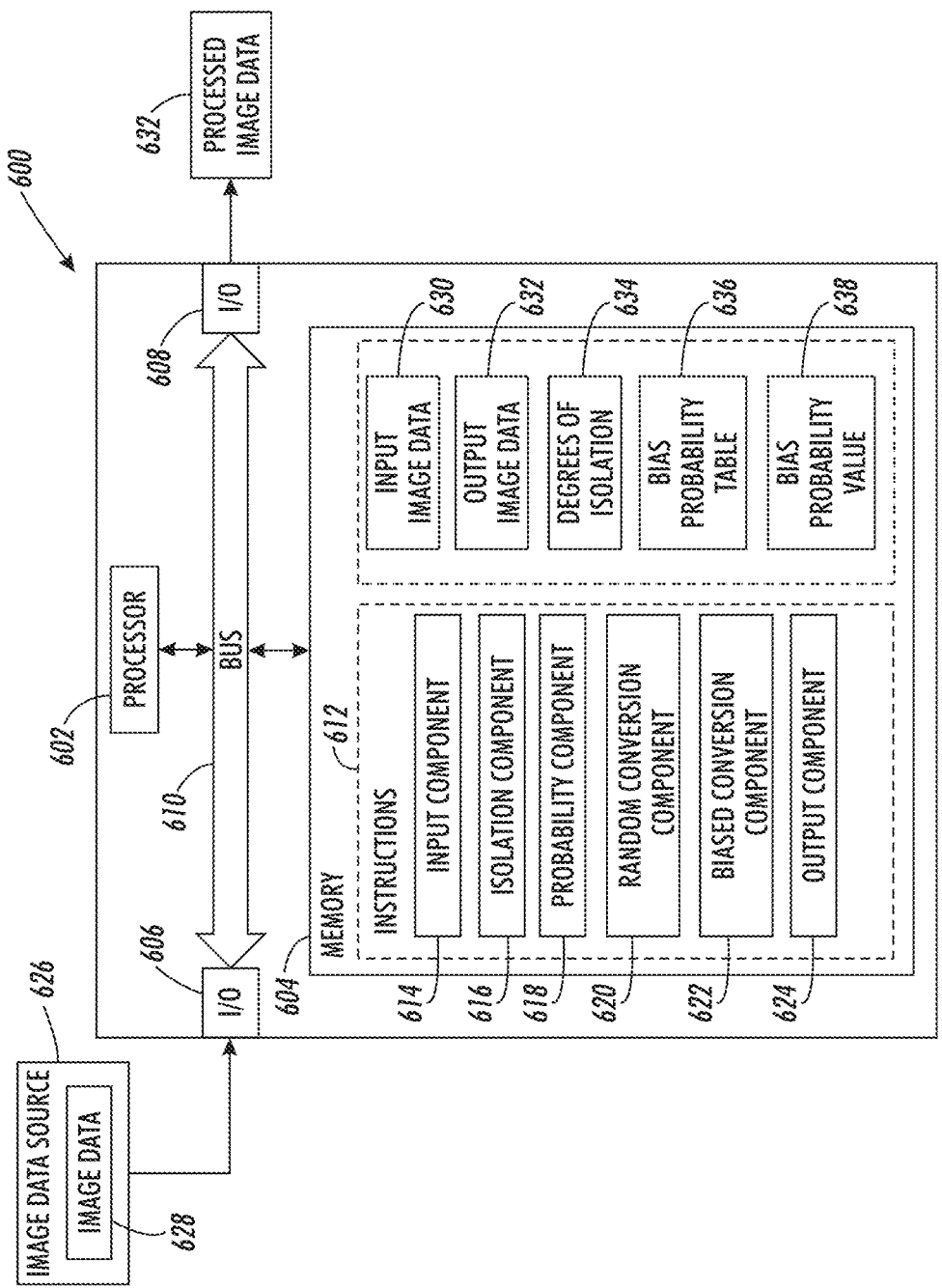
FIG. 6 is a block diagram of a printing system for performing the methods disclosed herein according to an exemplary embodiment of this disclosure.

The various components of the systems described above are now discussed in more detail with reference to FIG. 6. FIG. 6 illustrates a block diagram of a printing system 600 for upscaling and converting a multi-state contone image data associated with an input image into a higher resolution, binary output image data. The printing system 600 can be used with systems and methods disclosed herein and can include, for example, a printer, copier, multi-function machine, multi-function device (MFD), etc. The system 600 includes a tangible processor 602, a memory 604, one or more input/output (I/O) interfaces 606, 608, and a controller/bus 610 that operatively connects the processor 602, memory 604, and I/O interfaces 606, 608 together. The memory 604 can include instructions 612 for performing one or more of the steps of the methods described herein, and the processor 602 may execute such instructions 612 for performing at least a part or all of the steps of the methods discussed above.

The memory 604 may represent any type of non-transitory computer readable medium such as random access memory (RAM), read only memory (ROM), magnetic disk or tape, optical disk, flash memory, or holographic memory. In one embodiment, the memory 306 comprises a combination of random access memory and read only memory. In some embodiments, the processor 304 and memory 306 may be combined in a single chip.

The I/O interfaces 606, 608 may allow the system 600 to communicate with other devices via a wired and/or wireless connection, or via a computer network.

The processor 602 can be variously embodied, such as by a single-core processor, a dual-core processor (or more generally by a multiple-core processor), a digital processor, and cooperating method coprocessor, a digital controller, or the like.

The term "software," as used herein, is intended to encompass any collection or set of instructions executable by a computer or other digital system so as to configure the computer or other digital system to perform the task that is the intent of the software. The term "software" is also intended to encompass such instructions stored in storage mediums such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

In particular embodiments, the printing system 600 can include memory 604 storing instructions 612 including an input component 614, an isolation component 616, a bias probability component 618, a random conversion component 620, a biased conversion component 622, and an output component 622. The memory 604 may also store specific data structures, such as input image data 630, output image data 632, degrees of isolation data 634, bias probability tables 636, bias probability value data 638, and the like.

Figure 7:
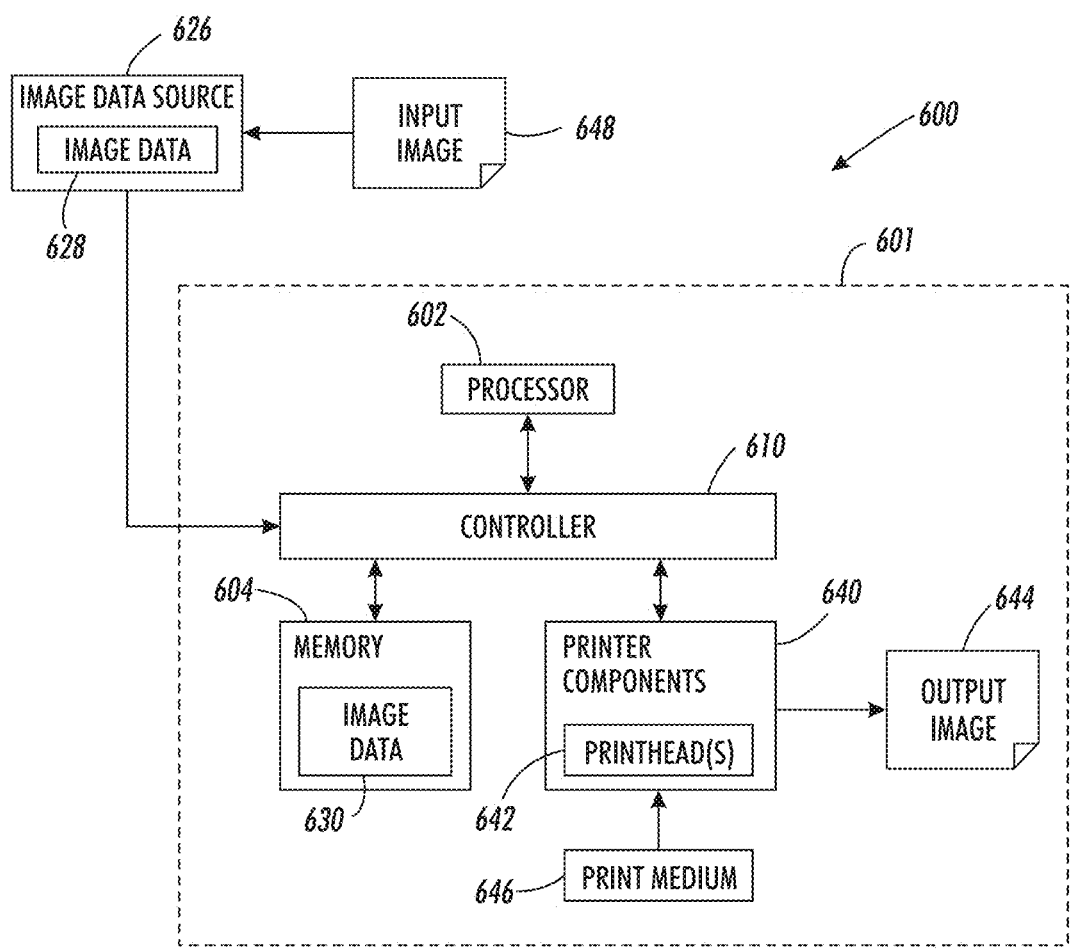
FIG. 7 is a second block diagram of a printing system for performing the methods disclosed herein according to another exemplary embodiment of this disclosure.

In particular embodiments, the input component 614 may be configured to receive, from an image source 626, image data 628 such as a multi-state contone image data 630, associated with an input image 648 (FIG. 7). In other embodiments, the input component 614 may be configured to convert the image data 624 into a multi-state contone image data 628.

The memory 604 includes instructions configured to convert each pixel of the multi-state contone image data into a pattern of activated inkjets in a plurality of N-by-M blocks of a binary output image data 630. In particular embodiments, this is accomplished by an isolation component 616 configured to determine a degree of isolation 634 of one or more pixels of the multi-state contone image data 630. As discussed above, the degree of isolation associated with the one or more pixels may be calculated by determining the number of zero-pairs associated with a pixel of the one or more pixels. Then, a probability component 618 may assign a bias probability value 638 to each of the one or more pixels based on the corresponding degree of isolation (i.e. number of zero-pairs) using a pre-determined bias probability table 636. The bias probability component 618 may also determine whether to bias one or more of the pixels based on the bias probability value 638 associated with each pixel. Then, either the random conversion component 620 or the biased conversion component 622 is used to convert the multi-state contone image data 630 into a higher resolution binary output image data 632. The random conversion component 620 can be configured to generate a randomized pattern of activated inkjets within one or more of the N-by-M blocks of the binary output image data 632, while the biased conversion component 622 can be configured to generate a biased pattern of activated inkjets within one or more of the N-by-M blocks of the binary output image data 632.

The memory 612 may also contain an output component 624 configured instruct the processor to output the higher resolution binary output image data 632. For example, the output image data 632 may be output to another printer inside or outside of the system 600, or to another memory device for storage. In other embodiments, the output component 624 may be configured to operate at least one inkjet with reference to the binary output image data 632 to form an output image 644 on a print medium 646 (i.e. image-receiving surface) that corresponds to the binary output image data 632.

With reference to FIGS. 6 and 7, the system 600 may also include additional components 640, including one or more printheads 642 comprising at least one inkjet, which may be operated by the processor 602 based on instructions 612 stored in the memory 604.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of upscaling an input image from a lower resolution to a higher resolution, the method comprising:
receiving a multi-state contone image data associated with the input image having a first resolution, wherein the multi-state contone image data includes a plurality of pixel values and an associated ink droplet size selected from two or more possible ink droplet sizes for each pixel of the multi-state contone image;
determining a degree of isolation for each of the pixels of the multi-state contone image data;
assigning a bias probability value to each pixel of the multi-state contone image data based on the degree of isolation corresponding to each pixel;
converting each pixel value of the multi-state contone image data into a pattern of single-state inkjets activated in a plurality of N-by-M blocks of a binary output image data based on the bias probability value assigned to each pixel, wherein the single-state inkjets are configured to eject ink droplets of a single size; and
outputting the binary output image data having a second resolution;
wherein N and M are integers greater than or equal to 1; and
wherein the second resolution is greater than the first resolution.

2. The method of claim 1, wherein the method further comprises:
operating at least one inkjet in a single-state printhead with reference to the binary output image data to form an output image that corresponds to the binary output image data.

3. The method of claim 1, wherein the degree of isolation for each of the pixels of the multi-state contone image data is determined by:
receiving pixel values for a plurality of pixels within P-by-Q block of the multi-state contone image data; and
determining a number of zero-pairs associated with a first pixel of the plurality of pixel in the P-by-Q block;
wherein P and Q are integers greater than or equal to 2; and
wherein the degree of isolation of the first pixel is equal to the number of zero-pairs associated with the first pixel.

4. The method of claim 3, wherein the number of zero-pairs associated with the first pixel of the plurality of pixel values in the P-by-Q block is determined by:
identifying up to four pairs of pixels adjacent to the first pixel in the P-by-Q block;
identifying the pixel values for each of the pixels adjacent to the first pixel in the P-by-Q block; and
counting the number of pairs of pixels adjacent to the first pixel wherein both adjacent pixels have a pixel value of zero;
wherein the first pixel may be represented as C0,0, having a position of (0,0) on an X-Y coordinate system, and the four pairs of pixels adjacent to the first pixel C0,0 may be represented by: C−1,0,C+1,0; C0−1,C0,+1; C−1,−1,C+1,+1; and C−1,+1,C+1,−1.

5. The method of claim 4, wherein if the first pixel less than eight adjacent pixels, the pixel value for the non-existent adjacent pixels is zero.

6. The method of claim 3, wherein the bias probability value for each pixel of the multi-state contone image data is assigned based on the number of zero-pairs associated with each pixel.

7. The method of claim 6, wherein the bias probability value for a pixel of the multi-state contone image data with four zero-pairs is 1.

8. The method of claim 7, wherein the bias probability value for a pixel of the multi-state contone image data with three zero-pairs is 0.75.

9. The method of claim 8, wherein the bias probability value for a pixel of the multi-state contone image data with two zero-pairs is 0.5.

10. The method of claim 9, wherein the bias probability value for a pixel of the multi-state contone image data with one zero-pair is 0.25.

11. The method of claim 10, wherein the bias probability value for a pixel of the multi-state contone image data with zero zero-pairs is 0.

12. The method of claim 6, wherein the method further comprises:
   determining whether to bias one or more pixels of the multi-state contone image data based on the assigned bias probability value; and
   converting each pixel value of the multi-state contone image data into the pattern of print jets activated in the plurality of N-by-M blocks of the binary output image data;
   wherein the pattern of print jets activated is one of a biased pattern or a randomized pattern based on the determination of whether to bias the one or more pixels of the multi-state contone image data.

13. A printing system that upscales an input image from a lower resolution to a higher resolution, the system comprising:
   a multi-state contone image data associated with the input image having a first resolution, wherein the multi-state contone image data includes a plurality of pixel values and an associated ink droplet size selected from two or more possible ink droplet sizes for each pixel of the multi-state contone image
   one or more printheads configured to operate one or more inkjets to eject ink droplets of only one size to form pixels in ink images on a print medium;
   a processor operatively connected to the one or more printheads; and
   a memory operatively connected to the processor and containing programming instructions that are configured to instruct the processor to:
      receive from an image source the multi-state contone image data;
      determine a number of zero-pairs associated with one or more pixels of the multi-state contone image data by analyzing a plurality of pixels surrounding the one or more pixels;
      assign a bias probability value to each of the one or more pixels based on the number of zero-pairs associated with each of the one or more pixels;
      determine whether to bias each of the one or more pixels based on the bias probability value assigned to each of the one or more pixels; and
      convert each of the one or more pixels of the multi-state contone image data into a pattern of activated inkjets in one or more N-by-M blocks of the binary output image data, wherein N and M are integers greater than or equal to 2;
      output the binary output image data having a second resolution;
   wherein the pattern of activated inkjets corresponding to each of the one or more pixels is one of a biased pattern or a randomized pattern based on the determination of whether to bias each of the one or more pixels; and
   wherein the second resolution of the binary output image data is greater than the first resolution of the multi-state contone image data.

14. The printing system of claim 13, wherein the memory further contains programming instructions that are configured to instruct the processor to:
   operate at least one inkjet in the one or more printheads with reference to the binary output image data to form an output image on a print medium or image-receiving surface that corresponds to the binary output image data.

15. The printing system of claim 13, wherein one or more of the pixels of the multi-state contone image data are converted into a pattern of activated inkjets for the N-by-M block, wherein the pattern is a randomized pattern.

16. The printing system of claim 13, wherein a first pixel of the one or more pixels of the multi-state contone image can have from between 0 and 4 zero-pairs; and
   wherein a pixel having 0 zero-pairs is assigned a bias probability value of 0, a pixel having 1 zero-pairs is assigned a bias probability value of 0.25, a pixel having 2 zero-pairs is assigned a bias probability value of 0.5, a pixel having 3 zero-pairs is assigned a bias probability of 0.75, and a pixel having 4 zero-pairs is assigned a bias probability value of 1.

* * * * *